United States Patent

Srinivasan

[11] Patent Number: 5,995,557
[45] Date of Patent: Nov. 30, 1999

[54] TONE DETECTION WITH ALIASING BANDPASS FILTERS

[75] Inventor: Balaji Srinivasan, Cary, N.C.

[73] Assignee: Nortel Networks Corporation, Canada

[21] Appl. No.: 08/873,875

[22] Filed: Jun. 12, 1997

[51] Int. Cl.[6] .............................. H03K 9/00; H04L 27/06; H04L 27/14; H04L 27/22

[52] U.S. Cl. ..................... 375/316; 379/31; 379/93.26; 379/93.27; 379/283; 379/339; 379/386

[58] Field of Search ............................. 375/316; 379/31, 379/386, 283, 93.26, 93.27, 339

[56] References Cited

U.S. PATENT DOCUMENTS

| | | | |
|---|---|---|---|
| 4,395,595 | 7/1983 | Nishitani et al. | 179/84 |
| 4,604,713 | 8/1986 | Godard et al. | 364/484 |
| 4,989,169 | 1/1991 | McCaslin et al. | 364/724.09 |
| 4,990,848 | 2/1991 | So | 324/76.41 |
| 5,119,322 | 6/1992 | Stroobach | 364/724.09 |
| 5,138,569 | 8/1992 | Valenzuela | 364/724.09 |
| 5,163,050 | 11/1992 | Cromack | 370/110.3 |
| 5,257,309 | 10/1993 | Brandman et al. | 379/283 |
| 5,321,745 | 6/1994 | Drory et al. | 379/351 |
| 5,333,191 | 7/1994 | McCarthy | 379/386 |
| 5,392,348 | 2/1995 | Park et al. | 379/386 |
| 5,528,663 | 6/1996 | Locke et al. | 379/31 |
| 5,619,564 | 4/1997 | Canniff et al. | 379/386 |
| 5,734,577 | 3/1998 | Chesir et al. | 342/159 |
| 5,809,133 | 9/1998 | Bartkowiak et al. | 379/386 |

FOREIGN PATENT DOCUMENTS 0 579 927 A2  1/1994  European Pat. Off. .

*Primary Examiner*—Stephen Chin
*Assistant Examiner*—Michael W. Maddox
*Attorney, Agent, or Firm*—Finnegan, Henderson, Farabow, Garrett & Dunner, L.L.P.

[57] ABSTRACT

To detect a dual tone pair signal in a telephone communication system, the signal is sampled at the Nyquist frequency. The sampled signal is filtered to determine the top three tone frequency power results. The input signal is then resampled at one-half of the Nyquist frequency. The resampled signal is filtered to determine signal power in the row and column frequency bands. The top three power results from tone filtering and aliasing row and column band pass filter power results are checked for lack of excess power to reject false digits.

16 Claims, 8 Drawing Sheets

TONE DETECTION WITH ALIASING BANDPASS FILTERS

BACKGROUND OF INVENTION

1. Field of Invention

The invention generally relates to tone detectors and, in particular, to a method for dual tone detection, implemented on a Digital Signal Processor (DSP) with aliasing bandpass filters, in the presence of speech, music and noise.

2. Description of Prior Art

Telephone communication systems commonly use a tone signal as a control command. The tone detection signals transfer call control information to a main communication network.

The dual frequency tone is a standard tone signal used in the public telephone system. For touch-tone dialing, the dual frequencies in the tone include a row component and a column component. The row and column refer to the location of the key on the grid of a telephone. For example, keys 1, 2, 3, and A share a row frequency, while keys 1, 4, 7, and * share a column frequency. For example, for digit 5, the phone sends row frequency 770 Hz and column frequency 1336 Hz. Most telephones do not have the fourth column, [A, B, C, and D].

This standard is set forth in Local Access and Transport Area Switching Systems Generic Requirements (LSSGR). These standards are referred to as Dual Tone Multi-Frequency Signaling (DTMF) which designates dual tone pairs having the frequencies as shown below in the DTMF row and column matrix:

TABLE 1

| Row/Column | 1<br>1209 Hz | 2<br>1336 Hz | 3<br>1477 Hz | 4<br>1633 Hz |
|---|---|---|---|---|
| 1 697 Hz | 1 | 2 | 3 | A |
| 2 770 Hz | 4 | 5 | 6 | B |
| 3 852 Hz | 7 | 8 | 9 | C |
| 4 941 Hz | * | 0 | # | D |

Systems to detect dual tone pairs have been available since the advent of the field of Digital Signal Processing (DSP). The ability to perform tone detection in the analog domain has existed even longer. Tone detection involves the detection of tones from a set of known frequencies and declaring the detected tones valid by checking the minimum duration, the spectral energy surrounding the tones, the deviation of the tone frequencies from the expected frequencies and other elements per the industry standards.

Recent changes in telecommunications have placed increased requirements on the robustness of the tone detection and the capacity or number of channels simultaneously supported in a given amount of time (commonly referred to as "realtime") by the tone detector. The robustness and the capacity of a tone detector are inversely proportional values for a given DSP processing power. As the detector's noise immunity and rejection of digits simulated by speech or music increases, the capacity supported by the detector decreases substantially. Therefore, it is desirable to minimize the time required to perform tone detection on a single channel, while maximizing the robustness of tone detection.

One method for detecting a tone is to look at the entire spectral content of the signal on the channel by performing a Fast Fourier Transform (FFT) in an attempt to validate a DTMF tone pair. While effective, this approach is an expensive solution due to the DSP processing required to perform an FFT across the entire 4 khz speech band used in telephony.

A more viable alternative is to look for just the predefined tone frequencies using one of two well-known techniques: Infinite Impulse Response (IIR) Filters and Finite Impulse Response (FIR) Filters. IIR Filters are essentially filters that are a function of the signal and past filter outputs. FIR Filter outputs are based on only the current input signal.

TABLE 2

| | | | |
|---|---|---|---|
| LSSGR TR-NWT-000506 Issue 3, Sept. 1991: Section 6.2. | | Echo: | Accept Echo 20 ms delayed |
| LSSGR TR-NPL-000275 Issue 1, April 1986: Section II | | | and 16 db down from orginal |
| AT&T recommendations from Notes on the Network Section | | | signal |
| | | | Single Frequency Deviation:<br>−1.5% < Accept < + 1.5% |
| Power: | Accept > =<br>−25 dbm/freq | | −3.5% < Reject <<br>+3.5% |
| | Reject < −55<br>dbm/freq | | Other Specifications: |
| Twist: | −8 dbr < Accept <<br>+4 dbr | | Talk_off rejection<br>from TR-TSY-000763 |
| Tone On Duration: | Accept > = 40 ms | | Gaussian/Impulse noise rejection |
| | Reject < 23 ms<br>Minimum cycle time =<br>93 ms | | Third frequency rejection<br>Power line noise<br>rejection |
| Interdigit Gap: | Accept > = 40 ms | | Registration in the presence of dial tone |
| | No minimum reject interval | | Rejection of short breaks in tone |
| Odbm is defined as lmW through a 600 ohm load | | | |

To comply with the domestically applicable LSSGR standards set forth in Table 2 above, or the internationally supported ITU/CCITT recommendations, high quality tone detection is required from a tone detector. To support the capacities needed today, while complying with standards, the approach has been to add processing power through the use of more expensive DSP processors or through the use of multiple DSP processors. Since minimizing system cost is also a primary objective, it is desirable to improve the accuracy and speed of tone detection and verification in a simple and efficient manner.

SUMMARY OF THE INVENTION

Systems and methods consistent with the present invention include detecting a dual tone pair, comprising steps and components for sampling an input signal at a sampling rate equal to the Nyquist frequency. The sampled signal is first respectively filtered at each predefined row and column frequency. The power of the sampled signal at eight predefined frequencies is calculated and sorted from highest to lowest power. The top three power results are saved for use in a tone detection algorithm. The input signal is resampled at a second sampling rate equal to one-half of the Nyquist frequency and then filtered once in the row frequency band and once in the column frequency band. The resampled input signal is purposefully not low pass filtered prior to performing the two band pass filter operations to allow aliasing of frequencies higher than the row and column band frequencies and to aid in rejection of simulated digits from ambient spectral energy around the user dialing the DTMF digits. The top three tone filter power results from the first filtering operation and the row and column bandpass filter results are sent to a tone detection algorithm for digit validation/rejection.

BRIEF DESCRIPTION OF THE DRAWINGS

The accompanying drawings, which are incorporated in and constitute a part of this specification illustrate embodiments of the invention and, together with the description, serve to explain the objects, advantages and principles of the invention:

In The Drawings,

FIG. 7($b$) is a graph illustrating an exemplary filter response for the sampled signal shown in FIG. 7($a$);

FIG. 7($c$) is a graph illustrating an exemplary filter response for the sampled signal shown in FIG. 7($a$), filtered at the 1209 hz column frequency;

FIG. 8($b$) is a graph illustrating an exemplary row aliasing band pass filter response for the resampled signal shown in FIG. 8($a$); and FIG. 8($c$) is a graph illustrating an exemplary column aliasing band pass filter response for the resampled signal shown in FIG. 8($a$).

DETAILED DESCRIPTION OF THE INVENTION

Figure 1:
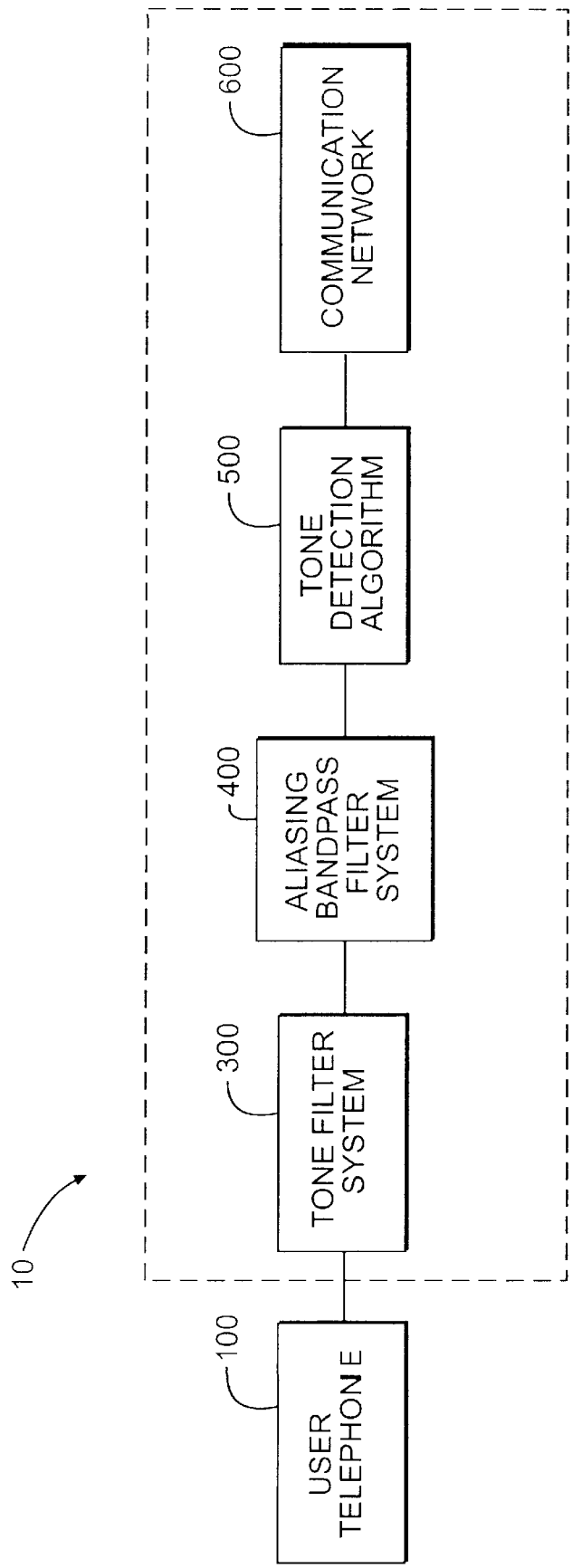
FIG. 1 is a block diagram of a communication system according to the present invention.

Reference will now be made in detail to the construction and operation of preferred implementations of the present invention, which are illustrated in the accompanying drawings. In those drawings, like elements and operations are designated with the same reference numerals where possible.

This invention relates to detecting the dual tone pairs defined in DTMF signaling. A dual tone pair is generally referred to as a DTMF digit or simply digit. DTMF signaling detection is difficult when performed in the presence of speech, music or noise, because these forms of spectral energy often simulate a DTMF digit. The key to robust tone detection is to account for enough of the power in the signal during tone detection to assure that digits simulated by speech or music or noise are rejected by the detector.

FIG. 1 shows a block diagram of a communication system according to the present invention comprising a user telephone 100, telephone office switching equipment 10. The switching equipment 10 includes a tone filter system 300, an aliasing band pass filter system 400, a tone detection algorithm 500, and a communication network 600.

Figure 2:
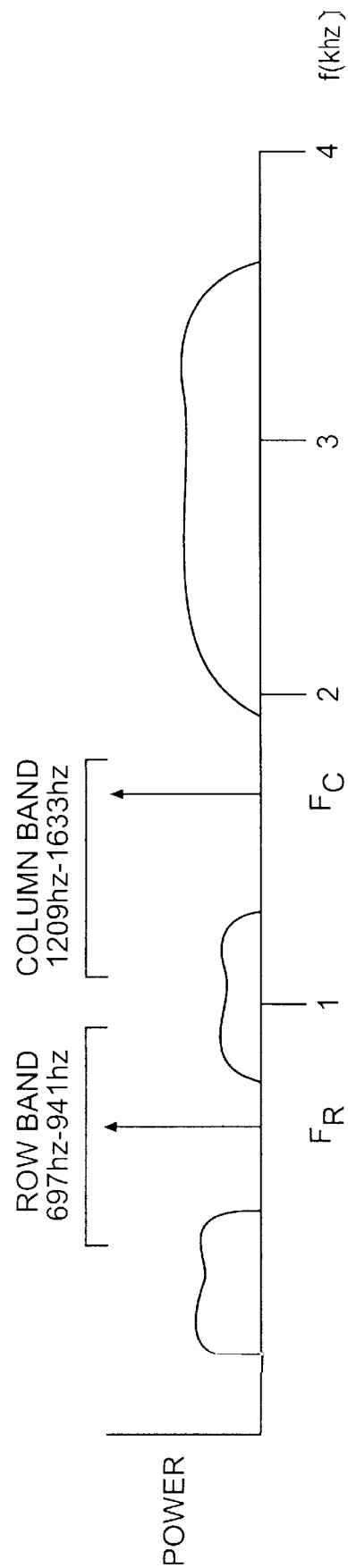
FIG. 2 is a simplified graph showing a DTMF tone pair and surrounding spectral noise.

FIG. 2 shows a simplified frequency domain graph of a signal that is to be processed for tones by the tone detector comprised of 300, 400 and 500. The original analog signal is sampled and digitized at a sampling rate of $F_S$. $F_S$ is usually set at the Nyquist frequency, which is defined as twice the highest frequency present in the sampled signal. The Nyquist theorem states that a signal to be sampled should only contain frequencies up to half the sampling frequency in order to uniquely determine the frequency content of the original signal. If the Nyquist theorem is not followed, then aliasing occurs, since frequencies above half the sampling rate in the original signal appear as other frequencies in the sampled signal. In telephony, the voice band is defined from 0 to 4 khz, and the incoming analog signal is low pass filtered with a cutoff frequency of 4 khz, and then sampled at the Nyquist rate. Therefore, the sampling rate $F_S$ is defined at 8 khz, the Nyquist rate, to avoid aliasing. In telephony, then, each sample of an input signal represents 125 microseconds of original analog input signal.

The dual tone pair comprising the digit to be detected is shown as $F_R$, the row frequency, and $F_C$, the column frequency. As previously described, the DTMF digit consists of one tone from the four row frequencies in the row band and one tone from the four column frequencies in the column band as shown in Table 1. Surrounding spectral energy that might accompany a DTMF tone pair or a simulated tone pair is shown in FIG. 2 as well (the figure is not to scale).

Figure 3:
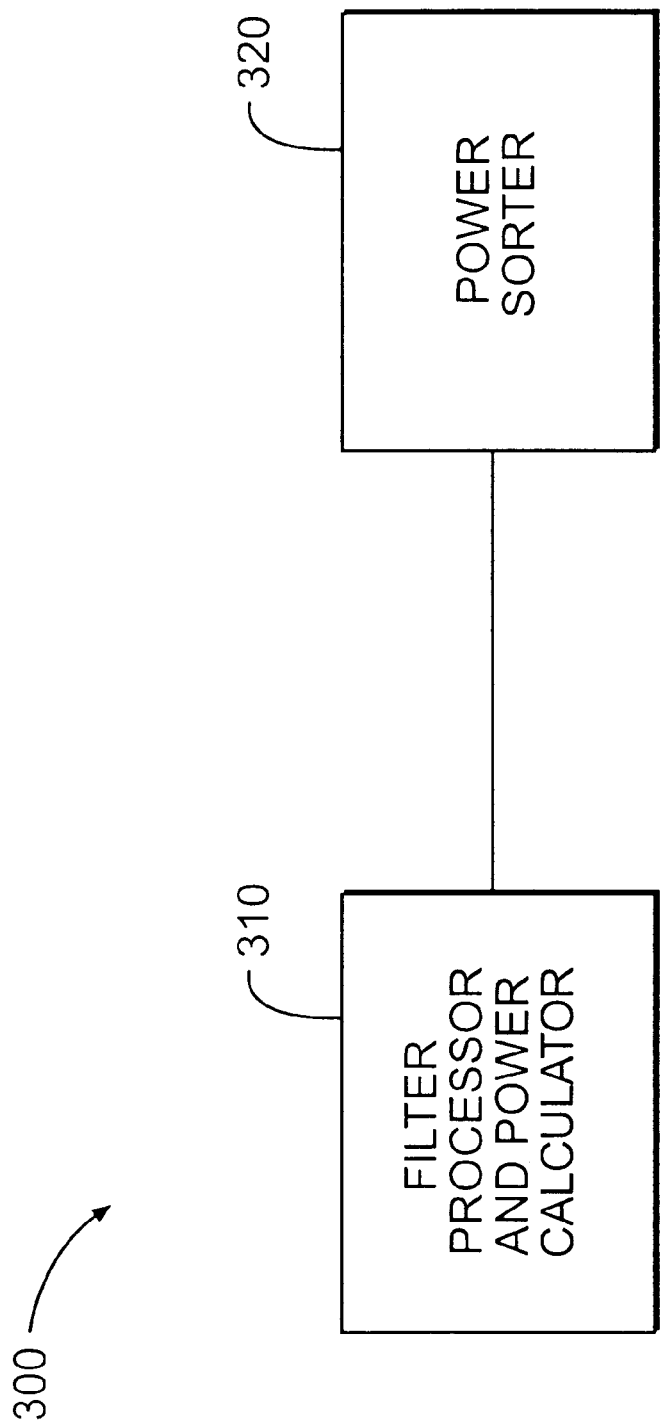
FIG. 3 is a block diagram of a tone filter system according to the present invention.

Filter system 300 of FIG. 1 is shown in more detail in FIG. 3. Filter processor 310 performs eight filtering operations. The sampled signal is filtered to look for any of the eight predefined row or column frequencies. This is done by performing eight power calculations in power calculator 320 using the equation (1) below. The correlation filtering technique is also referred to as a modified Hilbert Transform or Discrete Fourier Transform at a single frequency.

An equation to calculate the power from a signal sampled at $F_s$, at the tone frequency $f_c$, which is one of the predefined DTMF frequencies is as follows:

$$\text{Power}\left(w = 2\pi \frac{f_c}{F_s}\right) = \sqrt{\left(\sum_{n=0}^{N-1} x(n)h(n)\sin wn\right)^2 + \left(\sum_{n=0}^{N-1} x(n)h(n)\cos wn\right)^2} \quad \text{Equation (1)}$$

The variable h(n) is a set of low pass FIR coefficients with a Hamming, Kaiser or desired window function. The length of the window for viewing the signal x(n) may be any size. In a preferred embodiment, a length of 192 samples is the length of the window used for correlation. The tone filter 300 works as follows. Eight tone filters are performed on the input signal, one at each of the four row and four column DTMF frequencies defined in the standard, and a power result calculated for each of the filtering operations 310. The eight power results reflect the power of the input signal at each of those frequencies. The eight frequencies are sorted 320 in largest to smallest order. The top three are used by the tone detection algorithm 500.

Figure 4:
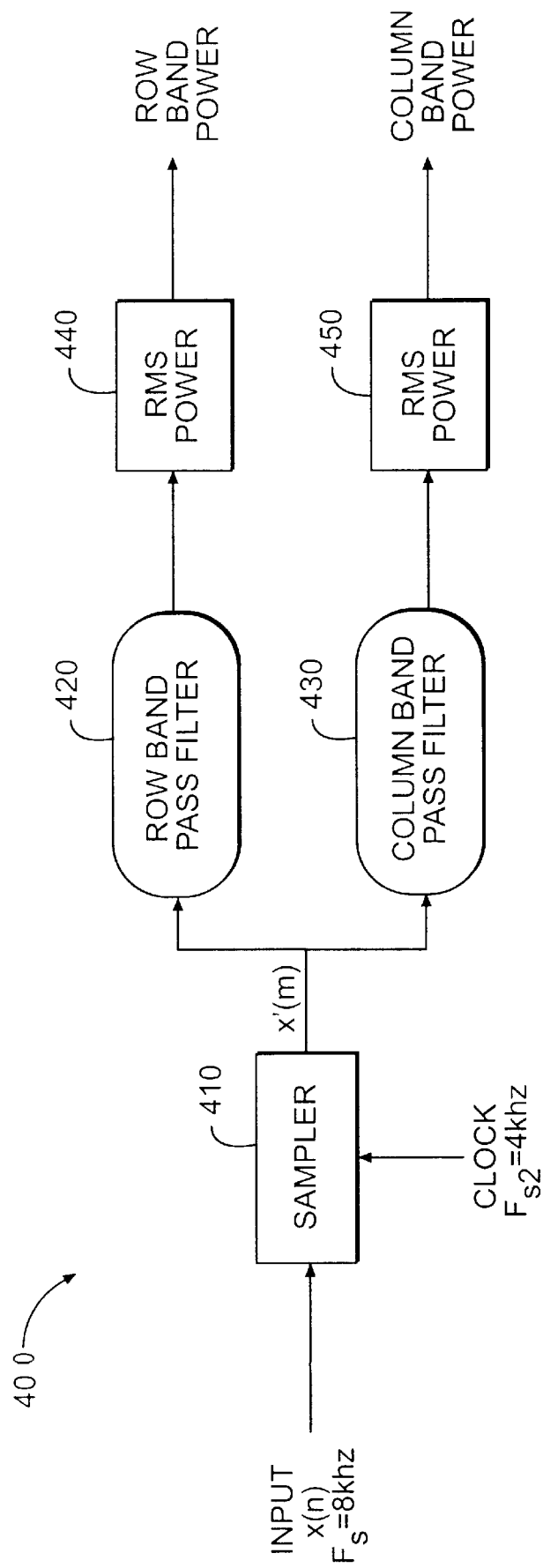
FIG. 4 is a block diagram of aliasing row and column band pass filters according to the present invention.

The aliasing and band pass filter system 400, shown in FIG. 4, assists in verifying the validity of the detected pair by calculating the power in row and column bands of the signal. The spectral energy accompanying the tone pair should be relatively quiet, or low in power, compared to the pair. To verify the accuracy of the pair, an input signal x(n) is input to sampler 410 and sampled at a rate set by the clock. The resulting signal x'(m) is sent to row band pass filter 420 and to column band pass filter 430.

The top three tone power results from 300 and the row and column band pass power results 400, are passed to the tone detection algorithm 500.

The tone detection algorithm 500 is an algorithm to verify that communication standards, such as LSSGR, are met by an input signal. The algorithm checks to see if the filters that resulted in the top two power levels, TP1 and TP2, are a row and column frequency that make a DTMF digit. It will then check the third highest power level, TP3, to make sure that it and hence all the other tone powers calculated in equation 1, are well below the tone pair's power level. The algorithm checks that the power of the row tone and the column tone, that comprise the digit, is roughly equal to the power in the row band and column band respectively. The algorithm checks other standard requirements such as by verifying—1) Minimum power required of top two tones; 2) Maximum power difference between top two tones; 3) Frequency deviation by comparing top two tones to their respective row and column aliasing band pass filter power result; 4) Difference between top two tones and their respective row and column band pass filter power results is in a range allowed by the standards; and 5) Tone length. If pair fails any of these tests reject the digit as invalid, otherwise it is valid.

To reduce the susceptibility of detecting false tone pairs, DTMF signaling standards clearly define how much spectral content is allowed to surround the signaling tone pair in the 4 khz voice band used in telephony. Also, only one tone from the row band and one tone from the column band is allowed in DTMF signaling. Further, the power of the entire spectral content, other than the tone pair, has to be least 10 db below the tone pair. The frequency of the tone pair must be within ±3.5% of the definition. All these requirements are checked by the detection algorithm 500. The detection algorithm also verifies the minimum tone pair on and off duration requirements. The power calculated in the row 440 and column band 450 are compared to the power of the signals at the frequencies suspected to be the dual tone pair.

The present invention aids in calculating the power output by the band pass filters 440 and 450 and accounting for the spectral energy outside of the DTMF row and column band to improve the tone detection, since speech and music have significant power in the entire 4 khz voice band. In a preferred embodiment, the present invention uses aliasing band pass filters as filters 420 and 430. These filters perform the calculation using equation (2) below.

$$Power = |y(m)| = \sum_{k=0}^{K-1} b_k \cdot x'(m-k) \quad \text{Equation (2)}$$

Figure 5:
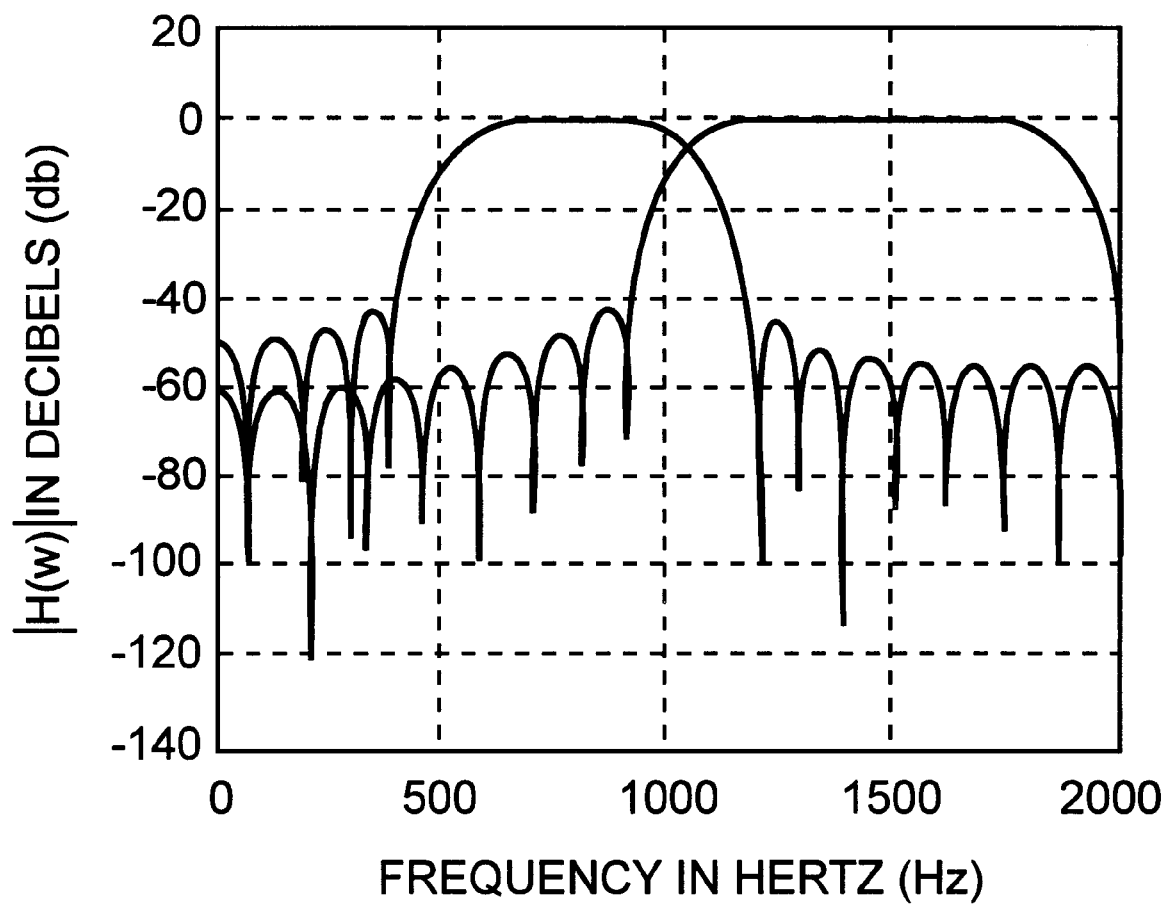
FIG. 5 is a graph showing the frequency response of aliasing row and column band pass filters for filtering signals sampled at one-half the Nyquist frequency.

In equation (2), the coefficients $b_K$ define the FIR band pass filter coefficients. The variable m represents the length of the window for viewing x(n). The order of the FIR filter, K, can be chosen based on the desired band pass filter response curve. In a preferred embodiment, the order K was chosen to be 29. FIG. 5 shows the response of the aliasing band pass filters for filtering signals sampled at one-half of the Nyquist frequency.

Normally a signal is sampled at the Nyquist frequency. However, the time required to perform the band pass filtering can be reduced by resampling the input signal at $F_{S2}$=4 khz, which is half the original sampling frequency $F_S$. The original input signal sampled at $F_S$ is defined as x(n), which is of length N, and the input signal resampled at rate $F_{S2}$, defined as x' (m), is of length M=N/2. Usually a low pass filter, with a bandwidth of 2 khz, would be applied to x' (m) to prevent aliasing from the 2 khz to 4 khz band onto the 0 to 2 khz band. But in this case, aliasing is a phenomenon that is taken advantage of in the filter equation (2).

In the block diagram of the aliasing row and column band pass filters of FIG. 4, the input signal, x(n), is resampled from $F_S$ to $F_{S2}$ to create x' (m). Creating the resampled signal x' (m) is as simple as choosing every other sample in the signal x(n). This operation is commonly referred to as decimation. In a preferred embodiment of the invention, the length of x' is M=96 samples. Then, band pass filtering is performed, using x' (m) without any low pass filtering, as shown in Equation 2. The row band pass filter calculates power in the input signal at all the frequencies from roughly 500 hz to 1100 hz including the four defined row frequencies. The column band pass filter calculates power in the input signal at all the frequencies from roughly 1100 hz to 1900 hz including the four defined column frequencies. In addition to the power from the DTMF bands, the resulting root mean square (rms) power calculation will contain power from frequencies aliased from the 2 khz to 4 khz range of the voice band.

Figure 6:
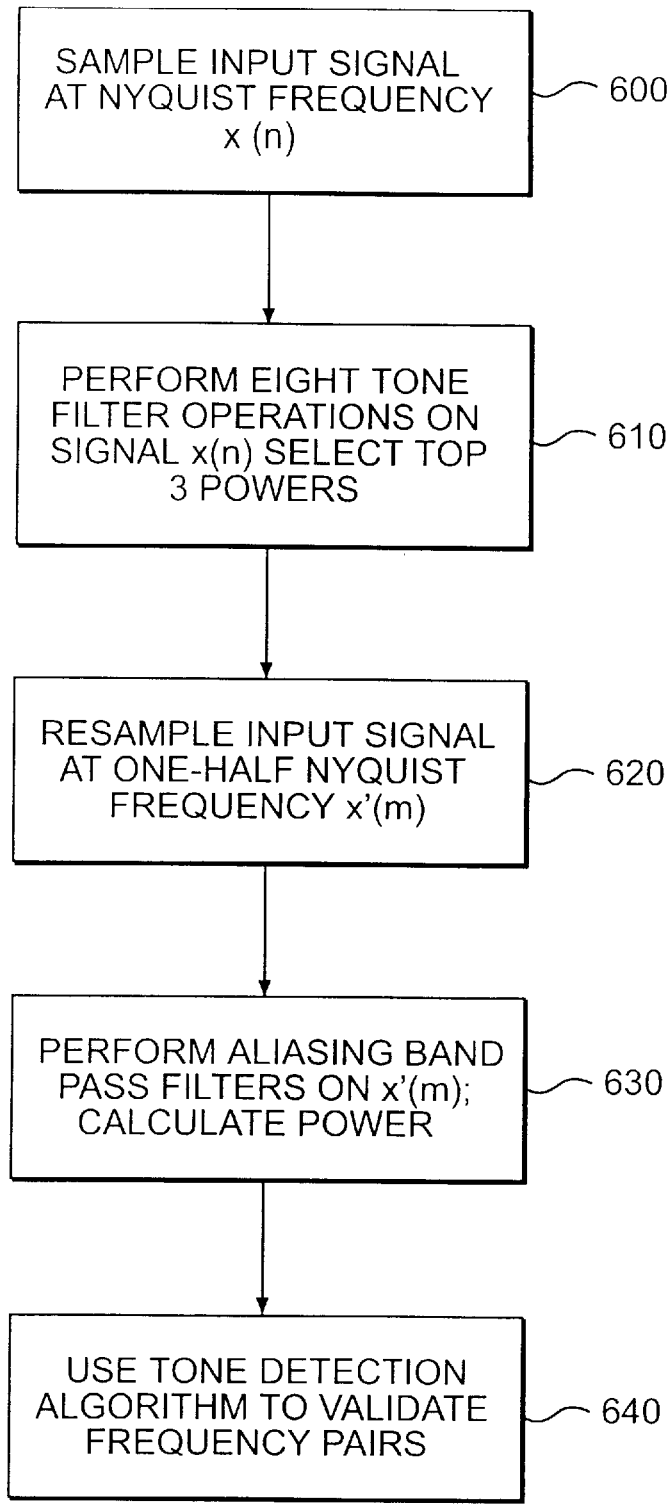
FIG. 6 is a flow chart of the steps for performing the present invention.
Figure 7C:
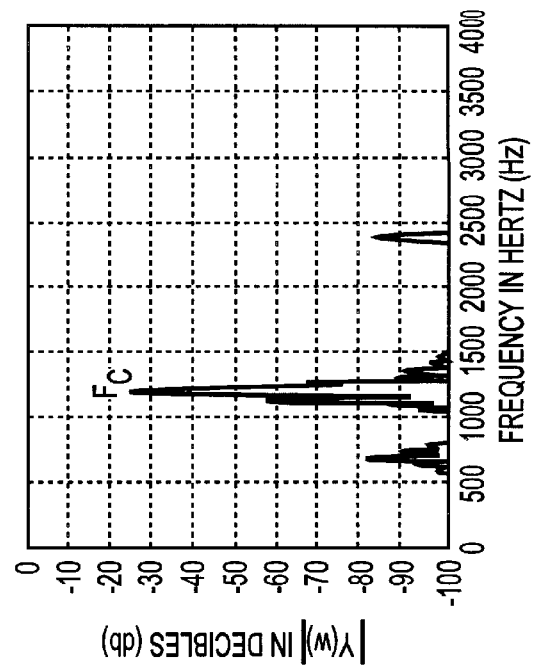
FIG. 7($a$) is a graph of an example signal sampled at the Nyquist frequency.
Figure 7A:
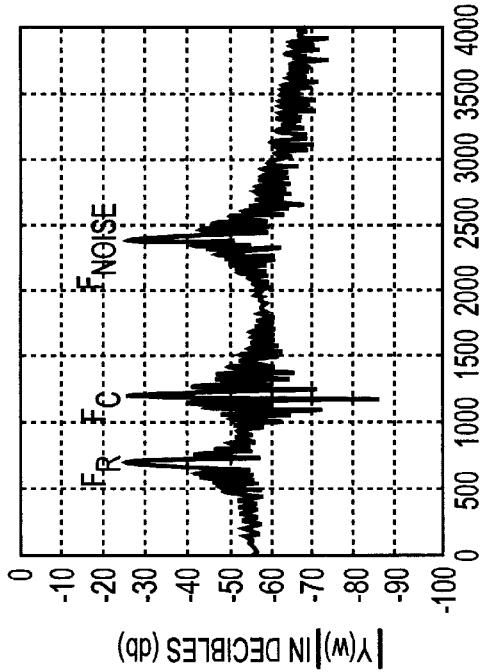
Figure 7B:
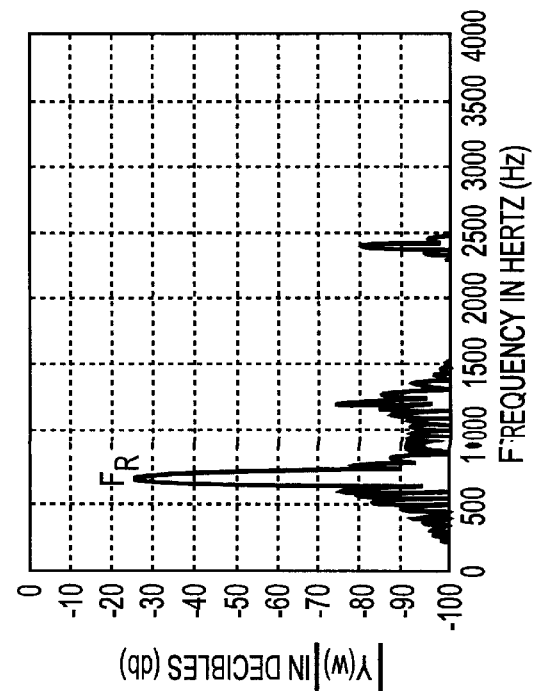
Figure 8A:
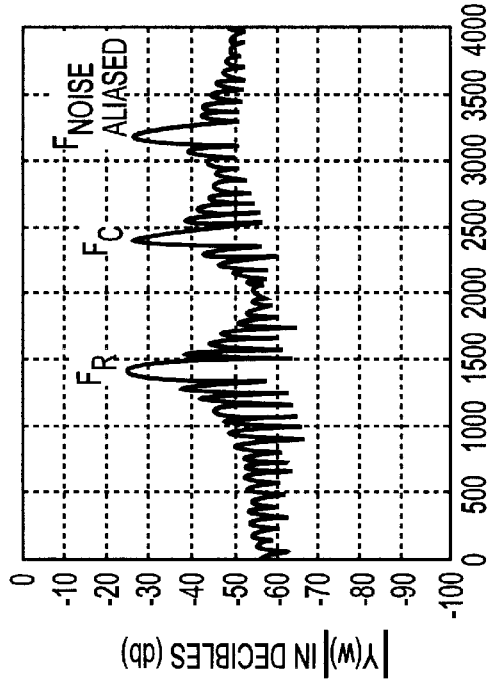
FIG. 8($a$) is a graph of the exemplary signal resampled at one-half of the Nyquist frequency.
Figure 8C:
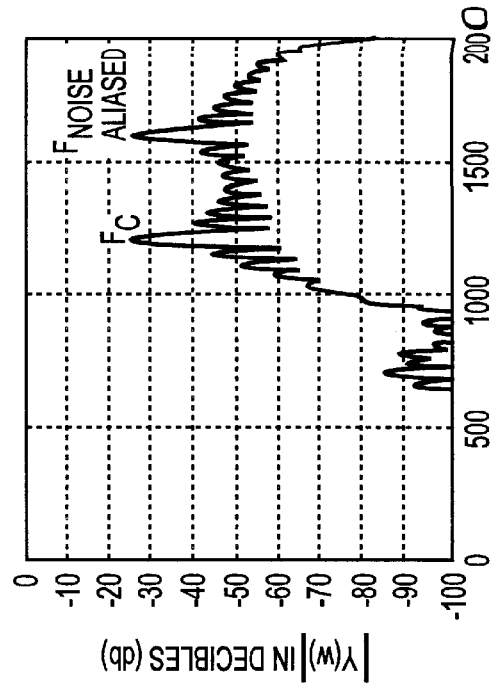
Figure 8B:
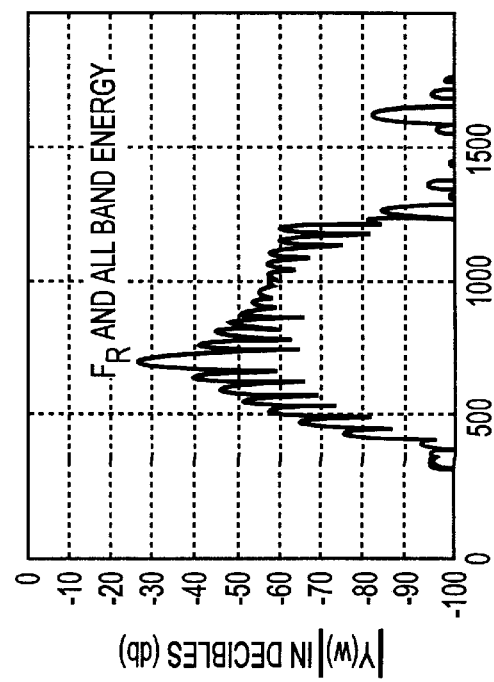

A simple example can be used to illustrate the principles of the invention with reference to FIGS. 6–8. First, an input signal is sampled at the Nyquist frequency x(n) (step 600). FIG. 7(*a*) shows the frequency characteristics of an input signal x(n) that contains two tones at the DTMF frequencies of 697 hz and 1209 hz and an interfering tone at 2400 hz.

Eight tone filter operations are performed on signal x(n) to identify the two DTMF tones present in the signal x(n), while filtering out the 2400 hz interfering tone using the correlation filtering technique (step 610) of FIG. 6. FIGS. 7(*b*) and 7(*c*) show responses of the 697 hz row tone filter and the 1209 hz column tone filter; the other six tone filters in this example produce no significant power results.

The input signal is resampled to create signal x' (m) (step 620), which is shown in FIG. 8(*a*). Notice that the 2400 hz tone is now aliased into the DTMF band at approximately 1600 hz. The aliasing band pass filters filter signal x' (m) (step 630). FIGS. 8(*b*) and 8(*c*) show responses of the aliasing row band pass filter and the aliasing column band pass filter, respectively.

Finally, the tone detection algorithm analyzes the power levels of the signal output by the band pass filter and the top three tone filters to validate or reject frequency pairs (step 640).

Example power results might be

| | |
|---|---|
| TP1 = 25 dbm | highest tone filter power result |
| TP2 = 25 dbm | second highest tone filter power result |
| TP3 = very small (<−50 dbm) | third highest tone filter power result |
| RBPF = −25 dbm | row band pass filter power result |
| CBPF = −22 dbm | column band pass filter power result |

A comparison of the 697 hz tone filter power result shown in FIG. 7(*b*) with the aliasing row band pass filter power result shown FIG. 8(*b*) illustrates no excess power. But the aliasing column band pass filter power comparison result for this example will show about 2 to 3 db additional power in the aliasing column band filter result shown in FIG. 8(*c*) above the 1209 hz tone filter power result shown in FIG. 7(*c*). The tone detection algorithm 640 will reject this example as an invalid DTMF tone due to the excess power seen in the column band. Speech noise and music will not always so clearly show an interfering tone. But the overall excess spectral energy found around simulated digits will be accounted for in the aliasing band pass filter power results and aid in rejection.

The present invention is preferably used in a tone receiver designed to meet the LSSGR requirements, as shown in Table 2, and comply with the ITU/CCITT recommendations Q.24. LSSGR is applicable in the North American telephony market while ITU/CCITT recommendations are for the international telephony market.

The tone detector of the present invention allows for the accurate rejection of invalid dual tone pairs well beyond the minimum accepted criteria defined by standards.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A system for detecting a dual tone pair, comprising:

means for sampling an input signal at a first sampling rate;

means for respectively filtering the sampled signal at a plurality of frequencies;

means for determining a power of the sampled signal at each of the plurality of frequencies;

means for sorting the frequencies in descending power levels;

means for resampling the input signal at a second sampling rate, said second sampling rate being slower than the first sampling rate;

aliasing band pass filters for filtering the resampled signals in row and column bands;

means for calculating a power of the filtered resampled signal in the row and column bands, and means for comparing the power of the band pass filtered resampled signal to the power at the top three sorted frequencies of the signal sampled at the first sampling rate.

2. The system according to claim 1 wherein the first sampling rate is set at a Nyquist frequency.

3. The system according to claim 1 wherein the second sampling rate is one-half of a Nyquist frequency.

4. The system according to claim 1 wherein the means for respectively filtering the sampled signal includes means for filtering the sampled signal at four predefined row frequencies; and means for filtering the sampled signal at four predefined column frequencies.

5. The system according to claim 1 further including means for sorting eight tone filter power results and presenting the top three power results along with the band pass power results to a tone detection algorithm.

6. The system according to claim 5 wherein the tone detection algorithm verifies the requirements defined by telecommunication standards.

7. The system according to claim 1 wherein the means for determining tone filter power includes means for performing the following calculation:

$$Power\left(w = 2\pi \frac{f_c}{F_s}\right) = \sqrt{\left(\sum_{n=0}^{N-1} x(n)h(n)\sin wn\right)^2 + \left(\sum_{n=0}^{N-1} x(n)h(n)\cos wn\right)^2}.$$

8. The system according to claim 1 wherein the aliasing band pass filters include means for calculating power according to the following equation:

$$Power = |y(m)| = \sum_{k=0}^{K-1} b_k \cdot x'(m-k).$$

9. A method of detecting a dual tone pair, comprising:

sampling an input signal at a first sampling rate;

respectively filtering the sampled signal at a plurality of frequencies;

determining a power of the sampled signal at each of the plurality of frequencies;

sorting the plurality of frequencies in descending power result order;

selecting the top three power result frequencies;

resampling the input signal at a second sampling rate, said second sampling rate being slower than the first sampling rate;

filtering the resampled signals at row and column band frequencies;

calculating a power of the filtered resampled signal in the row and column bands; and presenting the top three power result tone frequencies and the calculated power of the filtered resampled signal in the row and column band frequencies to a tone detection algorithm to review power levels.

10. The method according to claim 9 wherein the step of sampling at a first sampling rate includes the step of sampling at a Nyquist frequency.

11. The method according to claim 9 wherein the step of resampling at a second sampling rate includes the step of sampling at one-half of a Nyquist frequency.

12. The method according to claim 9 wherein the step of respectively filtering the sampled signal includes the steps of filtering the sampled signal at four predefined row frequencies; and filtering the sampled signal at four predefined column frequencies.

13. The method according to claim 9 further including the step of the tone detection algorithm using the top three power results and row and column aliasing band pass filter results to verify the dual tone pair or reject the pair as a simulated digit.

14. The method according to claim 13 wherein the requirements are defined by telecommunication standards.

15. The method according to claim 9 wherein the step of determining includes the step of performing the following calculation:

$$Power\left(w = 2\pi \frac{f_c}{F_s}\right) = \sqrt{\left(\sum_{n=0}^{N-1} x(n)h(n)\sin wn\right)^2 + \left(\sum_{n=0}^{N-1} x(n)h(n)\cos wn\right)^2}.$$

16. The method according to claim 9 wherein the step of filtering the resampled signal includes the step of calculating power according to the following equation:

$$Power = |y(m)| = \sum_{k=0}^{K-1} b_k \cdot x'(m-k).$$

* * * * *